May 31, 1966  T. M. KERSKER ETAL  3,253,638
HIGH PRESSURE PNEUMATIC TIRE
Filed Nov. 14, 1963

*INVENTOR.*
THEODORE M. KERSKER
BY ARNOLD H. BRIDGE, JR.

*J. B. Holden*
ATTORNEY 3,253,638
HIGH PRESSURE PNEUMATIC TIRE
Theodore M. Kersker, Akron, and Arnold H. Bridge, Jr., Cuyahoga Falls, Ohio, assignors to The Goodyear Tire & Rubber Company, Akron, Ohio, a corporation of Ohio
Filed Nov. 14, 1963, Ser. No. 323,650
10 Claims. (Cl. 152—359)

This invention relates to tires and, more particularly, to an improved tire construction for high pressure tires as hereinafter defined.

High pressure tires are heavy duty tires inflated to pressures exceeding 50 pounds per square inch and may be inflated to several hundred pounds per square inch. Such tires have bead diameters from 18 to 26 inches and load carrying capacities from two tons up to twenty tons or more per tire. Examples of such high pressure heavy duty tires include tires for over-the-road vehicles, such as trucks, busses, tractor-trailer vehicles, and the like; on and off-the-road vehicles, such as cement mixers; and off-the-road vehicles, such as earth movers, logging rigs, mining vehicles, and the like.

High pressure tires of the character described have been made with from about 10 to upwards to 36 plies of textile fabric extending from bead to bead and have required a plurality of bead rings or grommets in each of the bead portions of the tire. Although the number of plies in such tires has been reduced in past years, due to the change over from cotton to rayon cords and from rayon to nylon cords, the number of plies has not been reduced below about eight plies. Reduction of the number of plies below eight has not been achieved because as the number of plies is reduced, the flexibility of the tire and the required flex fatigue requirements of the cords increase beyond the capabilities of conventional cord and tire constructions.

It is an object of this invention to provide a high pressure, high load carrying capacity tire having a minimum number of plies of textile cord fabric of a unique three yarn construction with improved resistance to flex fatigue.

Another object of the invention is to provide a high pressure high load carrying capacity tire having no more than a pair of plies extending from bead to bead which is cooler running, does not buckle under severe deflection and at the same time is more economical to build.

These and other objects will be more readily understood by reference to the following specification and the accompanying drawings in which.

Figure 1:
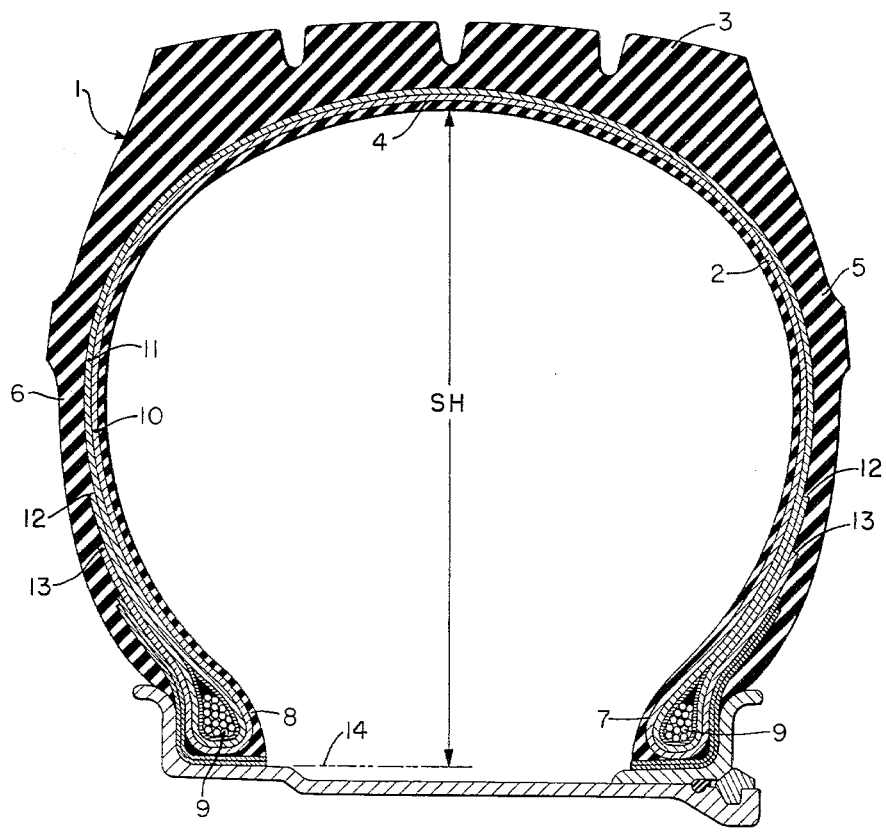
FIG. 1 is a sectional view of a tire of this invention.
Figure 2:
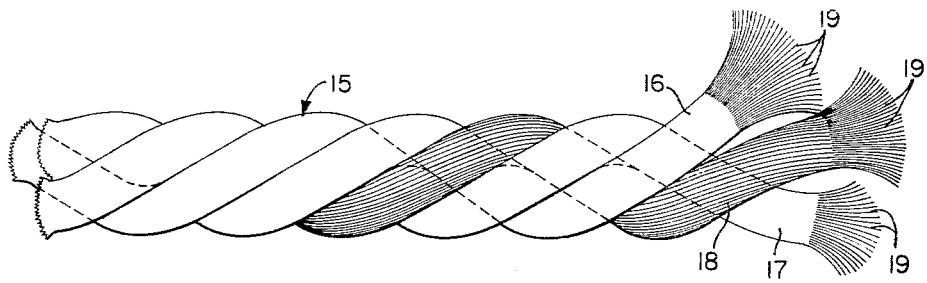
FIG. 2 is a fragmentary large plan view of the cords employed in the tire of this invention.

Referring to FIG. 1, a pneumatic tire generally indicated by the numeral 1 is comprised of a rubberized fabric body portion of carcass 2 of generally toroidal shape having a tread 3 superimposed and bonded to the crown area 4 of the carcass 2. Rubbery sidewalls 5 and 6 extend from the respective edges of the tread over the carcass to the bead portions 7 and 8. Each of the bead portions 7 and 8 include a single bead ring or grommet 9. Two plies 10 and 11 of rubberized parallel cord fabric extend from one bead portion 8 to the other bead portion 7. The cords of the plies 10 and 11 are preferably crossed at an angle of 30 to 65 percent relative to the centerline of the tire. The ply endings 12 and 13 extend around each bead grommet 9 and terminate in the sidewall areas 5 and 6. One of the ply endings 12 and 13 ends higher up in the sidewall area than the other ending, preferably the inner ply ending 12, but in any event at least one of the ply endings 12 and 13 terminate in the sidewall area between 30 percent and 60 percent of the sectional height (SH) as measured from the base 14 of the bead portion to the crown area 4 of the tire.

The cords 15 of each of the plies 11 and 12 are made of three yarns or plies 16, 17, and 18 twisted together. Each of the yarns is made of a multiplicity of twisted polymeric continuous textile filamentary material 19, such as nylon, Dacron, and the like.

The number of polymeric filaments 19 in each of the yarns is extremely large and preferably each yarn includes sufficient filaments equivalent to at least 6,000 denier but less than 40,000 so that the total denier of the cord is between 18,000 and 120,000 denier with a cord tensile strength of between 350 and 2,000 pounds per cord. The filaments in each yarn are twisted together with about 2 to about 8 turns per inch and the yarns 16, 17, and 18 are in turn cable twisted together with about 1 to about 4 turns per inch to form the cord 15. The cable or cord twist is opposite to and substantially less than the yarn twist. Preferably, the cable or cord twist has 50 to 70 percent of the number of turns per inch as are in the yarn twist. For example, in a 10:00 x 20 size truck tire having two plies 10 and 11, the overall denier of the cords 15 is greater than 18,000, the individual cords, for example, being made of 6720/3 nylon, that is, each of the yarns or plies 16, 17, and 18 have a denier of 6,720 or a total cord denier of 20,160. Each cord has a tensile strength of about 350 lbs. The yarns are twisted, for example, with 6 turns per inch, and the cable with 3.4 turns per inch so that the cable twist is about 57 percent of the yarn twist.

An example of a cord 15 used in an earth mover size tire of this invention is a 37,800/3 nylon cord. The total cord denier is 113,400 and the tensile strength is 2,000 pounds per cord. The yarns 16, 17, and 18 have 2.5 turns or twists per inch with the cable or cord twist being 1.4. The cable twist is, therefore, about 56 percent of the yarn twist.

While certain representative embodiments and details have been shown for the purpose of illustrating the invention, it will be apparent to those skilled in this art that various changes and modifications may be made therein without departing from the spirit or scope of the invention.

What is claimed is:

1. A high pressure pneumatic tire having a toroidal shaped body portion including a pair of bead portions, and a tread portion attached to the crown of said body portion, said body portion including not over two plies of parallel cord fabric material in which the ply endings are turned in the same direction around the same bead grommet in each of said bead portions, and terminate in the sidewall area of the tire the cords of said plies extending at an angle of between 30 and 65° relative to the centerline of said tire, said cords being made of synthetic continuous polymeric filamentary material, each cord having three yarns, each yarn having a plurality of filaments totalling at least 6,000 denier, said cords having a substantially fewer number of twists per inch than the twists per inch in said yarns.

2. A high pressure tire as claimed in claim 1 in which said cords have a tensile strength of at least 350 pounds per cord.

3. A high pressure tire as claimed in claim 1 in which said cords have a total denier of 18,000 to 120,000 denier and the cords have a cable twist of 1 to 4 turns per inch.

4. A high pressure tire as claimed in claim 1 in which said cords have a total denier of 18,000 to 120,000 denier and a yarn twist of 2 to 8 turns per inch.

5. A high pressure tire as claimed in claim 1 in which at least one of said ply endings terminate in the tire sidewall between 30 to 60 percent of the sectional height of the tire.

6. A tire as claimed in claim 4 in which said cords have a cord twist of from 1 to 4 turns per inch.

7. A tire as claimed in claim 1 in which the cord twist is 50 to 65 percent of the yarn twist.

8. A tire having a carcass comprising not more than two plies of synthetic cord fabric, the cords extending at an angle of 30 to 65° relative to the centerline of said tire said cords having a tensile strength of at least 350 pounds per cord, the cords being made of three yarns each consisting of a plurality of continuous polymeric filaments, said yarns being twisted together with 2 to 8 turns per inch, the number of turns per inch in said cords being 50 to 65 percent of the yarn twist.

9. A tire as claimed in claim 8 having a single bead grommet in the bead portion of the tire, both of said plies being turned around said grommets in the same direction.

10. A tire as claimed in claim 9 in which the plies terminate in the sidewall of the tire between 30 and 60 percent of the sectional height of the tire.

References Cited by the Examiner

UNITED STATES PATENTS

| | | | |
|---|---|---|---|
| 2,132,492 | 10/1938 | Parker | 152—359 X |
| 3,062,257 | 11/1962 | Campbell | 152—354 |
| 3,090,417 | 5/1963 | Spelman | 152—354 |

ARTHUR L. LA POINT, *Primary Examiner.*